UNITED STATES PATENT OFFICE.

GUSTAV FRITSCHE, OF STRZEBOWITZ, NEAR SCHÖNBRUNN, AUSTRIA-HUNGARY, ASSIGNOR TO THE ROESSLER & HASSLACHER CHEMICAL COMPANY, OF NEW YORK, N. Y., A CORPORATION OF NEW YORK.

PROCESS FOR THE MANUFACTURE OF SPIRITS.

No. 884,576.      Specification of Letters Patent.      Patented April 14, 1908.

Application filed June 28, 1907. Serial No. 381,334.

*To all whom it may concern:*

Be it known that I, GUSTAV FRITSCHE, a subject of the Emperor of Austria-Hungary, and a resident of Strzebowitz, near Schönbrunn, Austria-Hungary, have invented a certain new and useful Process for the Manufacture of Spirits, of which the following is a specification.

This invention relates to a process for the manufacture of spirits wherein formaldehyde is used an an antiseptic in combination with a mixture of certain nitrogenous animal and vegetable substances, whereby the yield of alcohol of said spirits is increased.

In the following I have described one means of carrying out this process, the features thereof being more particularly pointed out hereinafter in the claims.

It has been proven by many laboratory experiments that the antiseptic power of formaldehyde in connection with the manufacture of spirits is considerably increased by the addition thereto of a mixture of certain amount of nitrogenous animal and vegetable substances such as for instance milk and lupines. In the use of such a mixture there will be little or no bacterial germination and the increase of acidity is very slight.

While the formaldehyde by itself has a deforming action on the yeast cells, the mixture referred to has no destructive effect on the membrane of the yeast cells, and the yeast treated with the mixture is easily and quickly acclimated. It has not been possible so far to give a scientific reason for this peculiar phenomenon, but it is suggested that the combination of formaldehyde and a mixture of nitrogenous animal and vegetable substances prevents the deforming action of the formaldehyde itself and has at the same time a deadly effect on the bacteria.

It has been found by practical experiments in which a mixture of milk and lupines was used as the nitrogenous substance, that it is best to add a certain percentage of the mixture to the yeast as well as to the mash. The best proportions being as follows: 0.0164% of formaldehyde of the actual quantity of mash and 0.18% of a mixture of milk and an extract of lupines to the actual quantity of mash are mixed together. To this is added an equal amount of water. 11% of the mixture is added to the yeast and the balance of 89% is added to the mash.

As a concrete example of the practice of the process the following formula is given: Five kilogramers of lupines are soaked in fifteen liters of warm water and after being ground they are separated from the starch powder. The so obtained lupine extract is mixed with two and one-half liters of milk and then one liter of formaldehyde is added and the mixture brought to a total of twenty-two liters with cold water. This mixture is sufficient for sixty hectoliters of mash.

Practical use of the process in distilleries has shown that the yield of alcohol increases to 63.7 and even 67 liters per cent. per kilogram of starch, a result which has never before been equaled. The higher yield of the alcohol covers more than six times the cost of the reagent.

The process finds application in connection with the general ferments and molds used in grain distilleries whether the process is by malt, by acid, or by the use of saccharifying molds, or whether the work is done in closed or open vessels or by a mixed method of working, and in general for the treatment of all amylaceous matters and for all the worts of distilleries.

It is obvious that other nitrogenous vegetables than lupines can be used, such as peas, or other legumes, the principle being to make use of the proteid contained therein.

The proportions of vegetable and animal nitrogenous substances in the mixture may be varied, and the mixture may be utilized in the manufacture of any kind of alcoholic spirits, without departing from the spirit of my invention.

What I claim and desire to secure by Letters Patent of the United States is:—

1. In a process for the manufacture of spirits the adding of a mixture containing formaldehyde and a vegetable proteid.

2. In a process for the manufacture of spirits the adding of a mixture containing formaldehyde and a vegetable proteid substance to both the yeast and the mash.

3. In a process for the manufacture of spirits the adding to the amylaceous substance of a mixture containing formaldehyde, milk and a vegetable proteid.

4. In a process for the manufacture of spirits the adding of a mixture containing formaldehyde, milk and a vegetable proteid to both the yeast and the mash.

In witness whereof I have hereunto signed my name in the presence of two subscribing witnesses.

GUSTAV FRITSCHE.

Witnesses:
GERHARD FRITSCHE,
HUGO KOLARZIK.